Jan. 20, 1925.
H. S. HOLMES
1,523,593
ELECTRIC WELDING AND THE LIKE
Filed Jan. 3, 1922
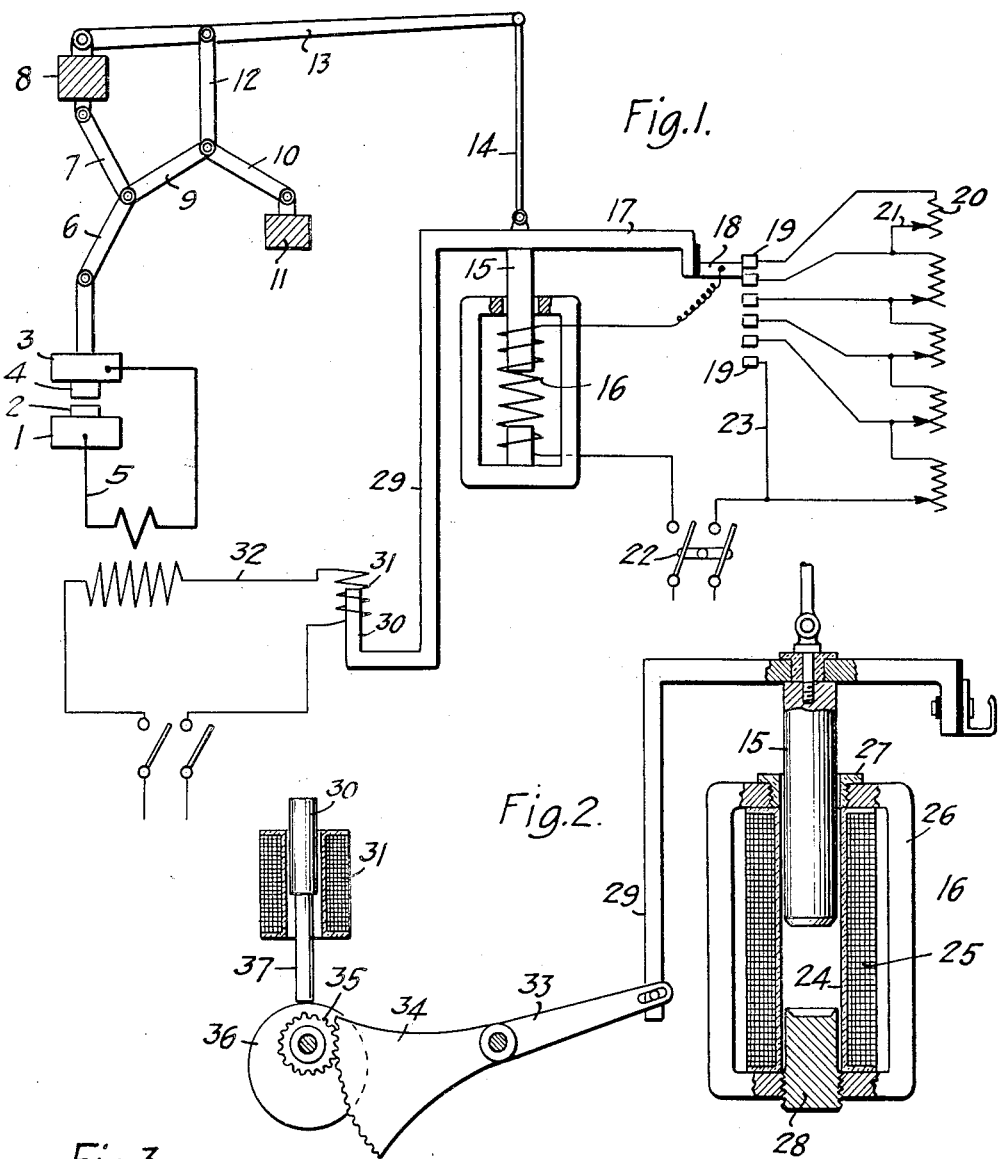
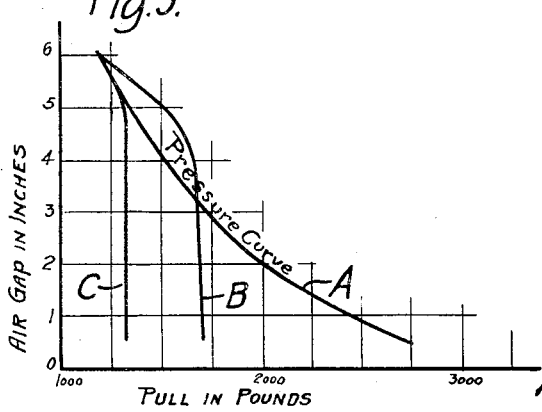
INVENTOR
HENRY S. HOLMES
BY
D. Anthony Usina
ATTORNEY Patented Jan. 20, 1925.

1,523,593

UNITED STATES PATENT OFFICE.

HENRY S. HOLMES, OF NEW YORK, N. Y., ASSIGNOR TO THOMAS E. MURRAY, OF BROOKLYN, NEW YORK.

ELECTRIC WELDING AND THE LIKE.

Application filed January 3, 1922. Serial No. 526,462.

*To all whom it may concern:*

Be it known that I, HENRY S. HOLMES, a citizen of the United States, and resident of the city, county, and State of New York, have invented certain new and useful Improvements in Electric Welding and the like, of which the following is a specification.

The principal purpose of the invention is to produce a weld with a minimum expenditure of electric energy and with a minimum current in-rush.

The present methods of electric welding by electrically heating the parts to be welded and pressing them together are generally unsatisfactory in the method of applying pressure. With the aid of the present invention the pressure may be controlled in such a way as to secure the best results. I provide also for controlling the welding current in such a way as to secure efficiency and economy. The features of improvement are of particular importance in connection with the Murray method of electric welding in which a current of extremely high amperage is used for a very brief interval of time, generally for a fraction of a second.

The accompanying drawings illustrate embodiments of the invention.

Fig. 1 is a diagram illustrating one style of apparatus;

Fig. 2 is an elevation partly in section showing an alternative design;

Fig. 3 is a diagram illustrating the variations in pressure during the progress of the operation.

In making an electric resistance weld, the heating effect at the point of contact of the pieces to be joined is proportional to the product of the resistance of the joint and the square of the current passing through the joint. As the resistance is greater, the current required to produce a given heating effect at the joint is smaller. If the electric energy is supplied at a constant potential (as is generally the case) an increased resistance in any circuit connected to such a supply will automatically reduce the current in that circuit.

It is not possible to maintain a high resistance at the point of contact of the two pieces to be welded and at the same time produce a perfect weld. When the joint has reached the welding temperature, an increased pressure is necessary to force the two pieces of metal into perfect union; and an increased pressure at this point decreases the resistance. However, it is advantageous to use the lowest pressure which will perfect the union of the metals, and thus to make the weld with a minimum expenditure of electric energy.

Again, in the case of the ordinary commercial supply of electric energy it is highly desirable to reduce the current demand to a minimum for a given power demand, because a high instantaneous current demand, such as is required in the Murray process, or a high current demand without a correspondingly high energy demand (which means a poor power factor) endangers the system of distribution, increases the losses therein and causes annoyance and inconvenience to other users of the same supply.

By the apparatus and method herein described I provide for producing a weld with a minimum amount of energy, and consequently a minimum cost to the welder, and with a minimum current demand and current inrush, which means the least danger and annoyance to the distributing lines and to other customers.

The ordinary means used for applying pressure during welding are open to considerable objections. The hand pressure method, even when applied by a skillful operator, is worthless when the welding time is short. The same is the case with the hydraulic pump. Air and steam cylinders are expensive to operate, bulky, dangerous and too slow in action. A powerful spring or a dead weight may be employed, but they require complicated means for resetting, without compensating advantages. Furthermore, none of the above mentioned methods permits of easily regulating or varying the pressure in a predetermined way, especially where the interval of time during which the current is applied is short.

A solenoid or electro-magnet is better than any of the above means for supplying the pressure for welding most metals and particularly for rapid welding. It is characteristic of a solenoid that the attractive force at the beginning of the stroke is less than at the end. A light pressure is thus obtained, with a high electric resistance and a comparatively small inrush of current, at the beginning of the operation. Not all solenoids are equally valuable for the purpose.

With the welding apparatus of my invention the pressure on the work is controlled to secure the desired variation during the operation. This control may be ensured by using a solenoid designed to give a determined pressure curve, or by using a solenoid or other electric motor and varying the current impressed on it during the welding operation. Although an electric motor, and particularly a solenoid or other type of electro-magnet, is probably the best device for this purpose, other instrumentalities may be used for effecting the pressure and for controlling it.

In the ordinary cases we would have a gradually increasing pressure from beginning to end. In other cases we might wish to use a pressure which is brought up to a certain amount in the beginning and is then held constant to the end. In the welding of brass and other non-ferrous metals where an extremely rapid take-up is required, it is best to use a high pressure at the start in order to ensure rapid acceleration of the pressure device, followed by a constant or even a decreased pressure toward the end to avoid excessive upsetting of such soft metals.

The machine illustrated is of the same general type as that described in the Murray Patent No. 1,320,895 of November 4, 1919.

A base 1 supports an electrode or terminal 2 which carries one of the pieces to be welded. A movable head 3 supports the other electrode or terminal 4. The current passes through the secondary circuit 5 of a transformer and the head 3 is pressed down to weld the parts together. The pressure is exerted through a toggle consisting of links 6, 7, the latter pivoted at its upper end to a cross beam 8. The movement of the toggle 6, 7 is effected by a second toggle comprising links 9 and 10, the latter pivoted to a fixed support 11. The movement of the toggle 9, 10 is effected through a link 12 depending from a long lever 13 the free end of which is connected by a link 14 to the plunger 15 of a solenoid indicated diagrammatically at 16.

An arm 17 on the plunger of the solenoid carries a contact brush 18. The brush may be operated by any other part of the lever mechanism, but the location shown is advantageous because it gives a long travel of the brush (about six inches in a given case) for a short movement at the electrodes 1, 3 (about three-quarters of an inch in the given case). This contact brush slides against a set of contacts 19 between which are connected resistances 20 which in turn are made variable by the movable contacts 21. The circuit of the solenoid includes a switch 22. When the latter is closed, the plunger 15 of the solenoid will be pulled downward and, by the action of the resistances 20, the voltage impressed on the solenoid will increase from a minimum at the beginning to the full line voltage at the end of the stroke. By the proper changes in the resistances 20 the increase of pressure may be made to take place along any desired curve.

If the direct wire 23 from the switch were connected to the opposite contact 19 from that shown, there would be a gradual decrease in the voltage impressed on the solenoid as the stroke continues. This might be made just enough to compensate for the natural increase in the force exerted by the solenoid as the plunger enters it to a gradually increasing extent, so as to give a straight line curve to the actual pressure exerted by the machine; or it might be arranged to give an actual decrease in pressure.

Fig. 3 is a diagram showing the air gap in inches and the pull in pounds exerted by the solenoid. The pressure curve A is a typical curve which would be desired in most cases. It may be secured by a proper design of the resistances described. Also I have shown in detail in Fig. 2 a solenoid which without the use of varying resistances in its circuit will give such a curve. A non-magnetic spool 24 carries a coil 25 of wire of such size as will secure magnetic saturation at the voltage of the electric circuit available with an air gap of a certain size, say one inch. The axial length of the coil is approximately twice its outside diameter and four times its inside diameter. A soft iron magnetic circuit 26 extends around the outside between the ends, with an opening at the upper end for a non-magnetic metal bushing 27, and carries a soft iron core 28 at the lower end fitting the inside of the spool. The ends of the plunger 15 and the core 28 are shaped to give an area slightly greater than the actual cross-section of these parts.

The solenoid used may be of the direct current type or of the alternating current type, using similar methods of varying the pressure in either case.

If for the work in hand the pressure of such a solenoid is too great at the full line voltage, it can be reduced by lowering the impressed potential by a series resistance or other means. If the pressure is not great enough, two or more solenoids may be employed. And in any case two or more solenoids may be employed with arrangements for connecting them to the line in parallel or in series or in series parallel, thus producing a varied range of pressures in the apparatus most efficiently.

The curve A, Fig. 3, shown for such a solenoid indicates that with an air gap of approximately five inches the pressure is about 1200 pounds, increasing to about 2500 pounds with an air gap of one inch. In the case of certain kinds of welding a pressure increasing along this curve will produce a weld with a minimum power input and a minimum current inrush. With other kinds of welding a different pressure curve is required for the best results. For the case of brass above described it would be better to secure a curve B with a very rapid take-up in the beginning and a constant pressure thereafter. In other cases we might wish to secure such a curve as is shown at C with a practically constant pressure from the beginning. By properly designing the solenoid or the outside controlling means or both, I may secure a pressure varying along any desired line.

I have stated above that a reduced resistance at the joint will naturally result in an increased flow of welding current. And the converse is true. The variations in pressure, and the consequent variations in resistance, as above described, will therefore alone produce a variation in the flow of current. I prefer, however, to separately control the welding current and thus to secure a greater flexibility of operation to fit a greater variety of cases than could be secured by varying the pressure alone.

For this purpose I have shown in Fig. 1 a bracket or arm 29 connected to the plunger of the solenoid (or it might be connected to any other suitable moving part), and carrying an iron core 30 adapted to enter and to be moved in a coil 31 in the primary circuit 32 of the welding transformer. As the plunger 15 moves into the solenoid the iron core will be drawn out of the choke coil 31 and this will increase the current at the weld. By suitably changing the connection the core 30 may be made to move into the coil and to decrease the welding current as the operation proceeds.

It is preferable to use a special device for determining and varying at will the rate of increase or decrease of the current, and I have indicated such a device in Fig. 2. Here the arm 29 is connected to a lever 33 which carries on its end a segment 34 engaging a pinion 35 on the shaft of a cam 36 which engages a rod 37 of non-magnetic material on the end of the iron core 30. As the welding operation proceeds from the position shown, the core 30 is moved out of its coil and the welding current is increased at a rate depending on the contour of the cam. For different operations different cams may be substituted for the one illustrated, thus controlling the rate of acceleration or of diminution of the current.

This outside regulation superimposed upon the natural variation in accordance with the resistance enables me to control the input of current along any desired curve.

Functions of the different elements of the apparatus having been described it remains to explain the mode of using the apparatus commercially. When a number of identical welds are to be made the controlling devices of the machine must be set to the most efficient welding condition. A person skilled in the art of welding will know the approximate amount and curve of pressure and current which will ensure a good weld. The constants of the pressure (solenoid) circuit and the welding current, that is to say the pressure at the beginning and the end and the welding current at the beginning and the end are then changed in different ways by properly setting the controlling devices, and the weld made with each setting, and the input of power for each weld is measured. A few such tests for all new cases will indicate which adjustment of the machine requires the minimum input of current, and this adjustment will be the proper one. A variation of the pressure controlling devices or of the current controlling devices in either direction from the setting so selected will increase the input to the welder. An experienced welder will locate the best adjustment with a very few trials.

The input of energy to the welder may be measured by known means. If the time of the weld is not too short a sensitive watt hour meter may be used; or if the weld is very rapid, an oscillograph. The oscillogram shows a current curve and a potential curve. The instantaneous values of the current and potential are added vectorially and a power curve formed. The area of the curve is integrated to obtain the input to the machine. The current inrush may be obtained from the current curve on the oscillogram or, in the case of a slow weld, from an indicating ammeter.

The invention has been described as an improvement in electric welding. The same disadvantages of inefficiency and annoyance or dangerous drafts of current occur with certain analogous operations such as riveting, forging and otherwise shaping metal softened by the passage of an electric current, particularly where a very rapid operation is contemplated; and the present apparatus and methods for controlling the pressure exerted on the work and the welding current are applicable with advantage to such analogous operations.

The electrodes 2 and 4 move directly toward each other and it is understood that the current passes through the full length of the joint in the work, or through a fixed point or zone in the length of the work, throughout the variation in pressure and the variation in current referred to. The invention may be applied to welding machines which operate in succession at different points along the length of the work, as by moving the work progressively between the electrodes 2 and 4, bringing these together at successive points in the advance of the work. The variations referred to, however, would take place for each of the successive welding operations.

Though I have described with great particularity of detail certain specific embodiments of my invention, yet it is not to be understood therefrom that the invention is restricted to the particlar embodiments disclosed. Various modifications thereof in detail and in the arrangement of the parts may be made by those skilled in the art without departure from the invention as defined in the following claims.

What I claim is;

1. An apparatus for welding and similar operations having means for exerting on the work a pressure which varies during a welding operation, and means for controlling such variation.

2. An apparatus for welding and similar operations having means for exerting on the work a pressure which increases during a welding operation and means for controlling such increase.

3. An apparatus for welding and similar operations having a motor for pressing the parts together and means for varying the power of said motor during a welding operation.

4. An apparatus for welding and similar operations having an electro-magnet for pressing the parts together with an increasing pressure during the welding operation and means for controlling the pressure of the electro-magnet.

5. An apparatus for welding and similar operations having a solenoid for pressing the parts together with an increasing pressure during the welding operation and means for controlling the pressure of the solenoid.

6. An apparatus for welding and similar operations having an electric motor for pressing the parts together and means for automatically varying the voltage impressed on the motor during the welding operation.

7. An apparatus for welding and similar operations adapted to weld by means of a current of extremely high ampere strength and of very brief duration and having means for exerting on the work a pressure which varies during such a welding operation, and means for controlling such variation.

8. An apparatus for welding and similar operations having pressure-exerting and controlling means designed to exert on the work during a welding operation a pressure which varies along a desired predetermined curve.

9. An apparatus for welding and similar operations adapted to weld by means of a current of extremely high ampere strength and of very brief duration and having pressure-exerting and controlling means designed to exert on the work during a welding operation a pressure which varies along a desired predetermined curve.

10. An apparatus for welding and similar operations having means for applying to the full length of a joint at once a current of extremely high ampere strength of very brief duration and means for automatically varying the welding current during a welding operation.

11. An apparatus for welding and similar operations having means for varying the welding current and means for automatically varying the pressure on the work, both during a welding operation.

12. An apparatus for welding and similar operations having means for applying a current of extremely high ampere strength and of very brief duration and means for automatically varying the welding current and means for automatically varying the pressure on the work, both during the welding operation.

13. A welding apparatus having means for varying the welding current and the pressure on the work, both during a welding operation, and means for controlling the variation of current.

14. An apparatus for welding and similar operation having means for applying a current of extremely high ampere strength and of very brief duration and means for automatically varying the current and the pressure on the work, both during a welding operation.

15. In electric welding and similar operations, the method which consists in exerting a pressure on the work during the welding operation and varying such pressure along a desired predetermined curve.

16. In electric welding and similar operations, the method which consists in exerting a pressure on the work during the welding operation and varying such pressure along a desired predetermined curve and varying the resistance to effect the weld with approximately a minimum input of current.

17. In welding and similar operations with a current of extremely high ampere strength and of very brief duration, the method which consists in exerting a pressure on the work during the welding operation and varying such pressure along a desired predetermined curve.

18. In welding and similar operations with a current of extremely high ampere strength and of very brief duration, the method which consists in exerting a pressure on the work during the welding operation and varying such pressure along a desired predetermined curve and varying the resistance to effect the weld with approximately a minimum input of current In witness whereof, I have hereunto signed my name.

HENRY S. HOLMES.